United States Patent
Wang et al.

(10) Patent No.: US 10,947,375 B2
(45) Date of Patent: Mar. 16, 2021

(54) SYSTEM AND PROCESS FOR THE PRODUCTION OF FUNCTIONALIZED OLEFINIC-BASED POLYMER

(71) Applicant: ExxonMobil Chemical Patents Inc., Baytown, TX (US)

(72) Inventors: Yu Feng Wang, Houston, TX (US); Richard D. Hembree, Houston, TX (US); Michael F. McDonald, Jr., Kingwood, TX (US); Joseph A. Maier, Port Neches, TX (US); Richard C. M. Yeh, Bellaire, TX (US); Leming Gu, Pearland, TX (US); Timothy D. Shaffer, Plainfield, NJ (US); Pamela J. Wright, Easton, PA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 222 days.

(21) Appl. No.: 15/774,302

(22) PCT Filed: Dec. 9, 2016

(86) PCT No.: PCT/US2016/065802
§ 371 (c)(1),
(2) Date: May 8, 2018

(87) PCT Pub. No.: WO2017/131869
PCT Pub. Date: Aug. 3, 2017

(65) Prior Publication Data
US 2020/0255643 A1      Aug. 13, 2020

Related U.S. Application Data

(60) Provisional application No. 62/289,001, filed on Jan. 29, 2016.

(51) Int. Cl.
*C08F 10/10* (2006.01)
*C08L 23/28* (2006.01)
(Continued)

(52) U.S. Cl.
CPC ......... *C08L 23/283* (2013.01); *B01J 19/0066* (2013.01); *B01J 19/06* (2013.01);
(Continued)

(58) Field of Classification Search
CPC .................................. C08F 10/00; B01J 19/20
See application file for complete search history.

(56) References Cited

U.S. PATENT DOCUMENTS

| | | |
|---|---|---|
| 3,099,644 A | 7/1963 | Parker et al. |
| 4,513,116 A | 4/1985 | Kowalski et al. |

(Continued)

FOREIGN PATENT DOCUMENTS

| | | |
|---|---|---|
| CN | 1160700 A | 10/1997 |
| JP | H02-95426 | 4/1990 |

(Continued)

*Primary Examiner* — Mark S Kaucher

(57) ABSTRACT

A system for producing a functionalized olefinic-based polymer, the system comprising a polymerization zone for producing an olefinic-based polymer comprising a mixing section, a deliquifying section, and a quenching section, wherein at least one section of the polymerization zone has a defined cross-sectional area that continually decreases from a first end to a second end of said section; a devolatilization zone comprising a kneader or extruder, wherein said devolatilization zone is downstream of said polymerization zone and in fluid communication with said polymerization zone; and a functionalization zone downstream of said devolatilization zone and in fluid communication with said devolatilization zone.

25 Claims, 5 Drawing Sheets

(51) Int. Cl.
    *B01J 19/00*     (2006.01)
    *B01J 19/06*     (2006.01)
    *B01J 19/18*     (2006.01)
    *B01J 19/20*     (2006.01)
    *C08L 23/26*     (2006.01)

(52) U.S. Cl.
    CPC ........... *B01J 19/1862* (2013.01); *B01J 19/20* (2013.01); *C08F 10/10* (2013.01); *C08L 23/26* (2013.01); *B01J 2219/0004* (2013.01); *C08L 2023/44* (2013.01)

(56) References Cited

U.S. PATENT DOCUMENTS

| | | |
|---|---|---|
| 4,563,506 A | 1/1986 | Kowalski et al. |
| 4,650,832 A | 3/1987 | Kowalski et al. |
| 4,714,747 A | 12/1987 | Bruzzone et al. |
| 5,087,674 A | 2/1992 | Gardner et al. |
| H1475 H | 8/1995 | Newman et al. |
| 5,670,582 A | 9/1997 | Chung et al. |
| 7,459,506 B2 | 12/2008 | Gebhart et al. |
| 7,662,900 B2 | 2/2010 | Seidl et al. |
| 8,519,093 B2 | 8/2013 | Diener et al. |
| 8,524,859 B2 | 9/2013 | Wang et al. |
| 9,309,333 B2 | 4/2016 | Paul et al. |
| 2010/0152396 A1 | 6/2010 | Fleury et al. |
| 2013/0203942 A1 | 8/2013 | Paul et al. |

FOREIGN PATENT DOCUMENTS

| | | |
|---|---|---|
| WO | 93/21241 A | 10/1993 |
| WO | 2004/067577 A | 8/2004 |
| WO | 2015/051885 A | 4/2015 |
| WO | 2016/069121 A | 5/2016 |
| WO | 2016/175938 A | 11/2016 |

SYSTEM AND PROCESS FOR THE PRODUCTION OF FUNCTIONALIZED OLEFINIC-BASED POLYMER

CROSS REFERENCE TO RELATED APPLICATIONS

This present application is a National Stage Application of International Application No. PCT/US2016/065802, filed Dec. 9, 2016, which claims the benefit of and priority to U.S. Patent Application No. 62/289,001, filed Jan. 29, 2016, the disclosure of which is incorporated by reference in its entirety.

FIELD OF THE INVENTION

This disclosure relates to a simplified system and process for synthesizing an olefinic-based polymer, preferably an olefinic-derived elastomer (e.g., butyl rubber), and functionalizing the polymer in the bulk phase.

BACKGROUND OF THE INVENTION

In certain polymerization processes, liquid or gaseous monomer is polymerized in the presence of a diluent in which the polymerization product is not appreciably soluble. As a result, a slurry is formed in which the solid polymerization product is dispersed in the form of polymer particles or agglomerates. In many of these processes, the diluent facilitates heat transfer away from the polymer agglomerates.

While these processes are technologically useful, these polymerization processes present several challenges. To begin with, the resultant slurry may have a relatively high viscosity, which inhibits mixing and heat transfer, and which can negatively impact polymer properties, reactor operability, and may cause reactor fouling. This relatively high viscosity also places practical limitations on the solids content of the slurry being produced. Also, since the reaction takes place in the presence of a diluent, there is a need to separate the polymer and polymer agglomerates from the diluent and ultimately deliquify and dry the polymer product.

As the skilled person appreciates, polymerizations of this nature are typically conducted within continuously-stirred tank reactors using adequate volumes of diluent and mixing to maintain fluid conditions. Following polymerization, the diluent, which is often an organic solvent, is removed by conventional solvent stripping techniques. For example, the solvent may be stripped from the polymerization product by using steam desolventization techniques, which produces a wet product that must be dried. These conventional processes, as well as the equipment used in these processes, can be energy intensive and costly.

Following polymerization, it is often desirable to functionalize the resulting polymer product. For example, isobutylene-based elastomers, such as butyl rubber, contain a small percentage of unsaturation deriving from the polymerization of one or more multiolefins. This unsaturation is generally randomly distributed throughout the polymer chain. As a result, the reactivity of isobutylene-based elastomers, and consequently their cure rate, is substantially less than highly unsaturated natural and synthetic rubbers. In an effort to improve cure characteristics of isobutylene-based elastomers, isobutylene-based elastomers are often functionalized via halogenation.

While many functionalization processes have been proposed for olefinic-based polymers, most commercial processes functionalize olefinic-based polymers in the liquid phase. For example, U.S. Pat. No. 3,099,644, which is incorporated herein by reference, teaches a process for the bromination of isobutylene-based elastomers while the isobutylene-based elastomer is in solution. Functionalization of isobutylene copolymers is also described in U.S. Pat. No. 5,670,582, which is incorporated herein by reference.

Despite commercial practices, the possibility of producing functionalized olefinic-based polymer through processes that employ bulk-phase olefinic-based polymer has been proposed. For example, U.S. Pat. Nos. 4,513,116 and 4,563,506, which are incorporated herein by reference, teach a process for the continuous bromination of butyl rubber by contacting the butyl rubber with a brominating agent in a continuous flow device while the butyl rubber is in the bulk phase. Specifically, these patents teach the continuous flow devices may include kneaders, extruders, and continuous mixers that are capable of subjecting the butyl rubber to deformation. These continuous flow devices are adapted to include multiple reaction zones including a first reaction zone where the butyl rubber is contacted with a brominating agent and a downstream neutralization zone where byproducts of the bromination reaction are released from the brominated butyl rubber product and removed from the continuous flow device.

At least one method of simplifying the overall process for producing an olefinic-based polymer and functionalizing the resulting polymer product has been proposed. WO 2015/051885A2 teaches a method for the production of halobutyl rubber by copolymerization of isobutylene and isoprene in a solvent to form butyl rubber, wherein the solvent can be non-soluble for a suspension process (for example chloromethane) or be soluble for a solution process (for example, isopentane, pentane, hexane), and the subsequent halogenation of the butyl rubber. According to the disclosure, at least the halogenation should be carried out using a halogenation agent, in particular chlorine or bromine, in a halogenation kneader. WO 2015/051885A2 discloses that the copolymerization of isobutylene and isoprene may take place within a copolymerization kneader. Alternatively, the copolymerization of isobutylene and isoprene and subsequent halogenation of the butyl rubber may both take place within a combination kneader.

However, because conventional slurry polymerization processes for the production of olefinic-based polymer and the equipment used in these processes can be energy intensive and costly, and because there remains ongoing desire to functionalize the resulting polymer product of these polymerization processes while the polymer product remains in the bulk phase, there is a continuing need for systems and processes in which slurry polymerizations and functionalization of the resulting polymer product in the bulk phase can be efficiently conducted.

SUMMARY OF THE INVENTION

The present invention relates to novel integrated polymerization and functionalization systems and processes that satisfy the need for systems and processes in which polymerizations, particularly slurry polymerizations, for the production of olefinic-based polymer and functionalization of the resulting polymer product in the bulk phase can be efficiently conducted.

Described herein is a synthesis system for producing a functionalized olefinic-based polymer, the system comprising a polymerization zone, a devolatilization zone downstream of the polymerization zone and in fluid communication with the polymerization zone, and a functionalization zone downstream of the devolatilization zone and in fluid communication with the devolatilization zone. The polymerization zone generally comprises at least a mixing section, a deliquifying section, and a quenching section, and has at least one section with a defined cross-sectional area that continually decreases from a first end to a second end of the section.

Also described herein is a process for producing the functionalized olefinic-based polymer. The process comprises first polymerizing a monomer mixture comprising at least one olefinic monomer and preferably at least one comonomer in the presence of a catalyst within a polymerization reactor to form a polymerization mixture comprising an olefinic-based polymer. Subsequently, the process comprises optionally deliquifying and/or quenching the polymerization mixture, followed by functionalizing the olefinic-based polymer. Generally, functionalizing the olefinic-based polymer comprises reacting the olefinic-based polymer substantially in the bulk phase with a functionalizing agent within a kneader reactor to produce a functionalized polymer and by-products of the functionalization reaction. Often, the monomer mixture comprises at least one $C_4$ to $C_7$ olefin monomer and at least one non-conjugated aliphatic diene, non-isoprene conjugated aliphatic diene, aromatic diene, or aryl monomer. Alternatively or additionally, the monomer mixture may comprise two or more $C_4$ to $C_7$ monoolefin monomers. Yet alternatively, the monomer mixture may comprise $C_3$ olefin monomer, $C_2$ olefin monomer, and optionally at least one diene monomer.

These and other features, aspects, and advantages of the present disclosure will become better understood with regard to the following description and appended claims.

BRIEF DESCRIPTION OF THE FIGURES

FIG. 2B' is a side cut-away perspective view of a deliquifying-quench extruder.

DETAILED DESCRIPTION OF THE INVENTION

Figure 1:
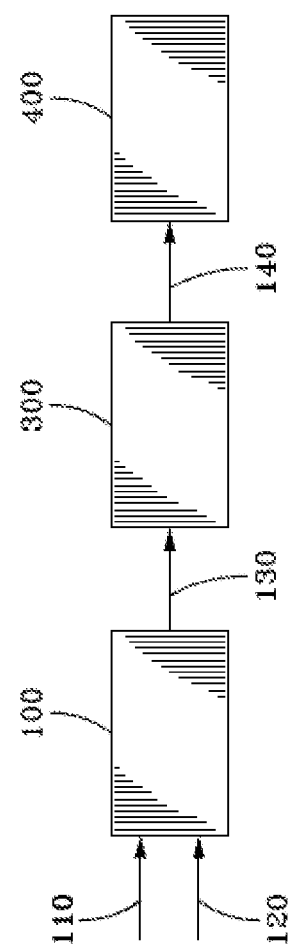
FIG. 1 is a schematic diagram of a functionalized olefinic-based polymer synthesis system.

Definitions applicable to the presently described invention are as described below.

The term "elastomer," as used herein, generally refers to polymers consistent with the ASTM D1566 definition of "a material that is capable of recovering from large deformations, and can be, or already is, modified to a state in which it is essentially insoluble (but can swell) in boiling solvent." As used herein, the term "elastomer" may be used interchangeably with the term "rubber." Elastomers may have a melting point that cannot be measured by DSC or if it can be measured by DSC is less than 80° C., or less than 20° C., or less than 0° C. Elastomers may have a Tg of −50° C. or less as measured by DSC. Exemplary elastomers may be characterized by a molecular weight distribution (Mw/Mn) of less than 10, alternatively less than 5, alternatively less than 2.5, an exemplary viscosity average molecular weight in the range of 200,000 up to 2,000,000 and an exemplary number average molecular weight in the range of 25,000 to 750,000 as determined by gel permeation chromatography.

The term "multiolefin," as used herein, refers to any monomer having two or more double bonds.

The term "aryl monomer," as used herein, refers to monomer including a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by replacing one or more hydrogens from the formula with an alkyl and/or vinyl group to form, for example, alkylstyrene.

The term "olefinic-based polymer," as used herein, refers to polymers derived from the polymerization of monomer including an olefin, i.e., an olefinic monomer, and optionally monomer copolymerizable therewith, and which include at least 50 mol % repeat units derived from an olefin. The term "olefinic-based polymer" may be used interchangeably with the term "olefinic-derived polymer." Preferred olefinic-based polymers of this invention are olefinic-based elastomers. For convenience, the term "rubber" may be used herein to refer to an olefinic-based elastomer.

The term "isoolefin-based elastomer" refers to (a) copolymers derived from the polymerization of at least one $C_4$ to $C_7$ isoolefin monomer and at least one multiolefin monomer, (b) homopolymers derived from the polymerization of $C_4$ to $C_7$ isoolefin monomers, and (c) random copolymers derived from the polymerization of $C_4$ to $C_7$ isoolefins and alkylstyrene.

Types of "isoolefin-based elastomers" include "isobutylene-based elastomers," which refer elastomers including at least 70 mol % repeat units from isobutylene. These polymers can be described as random copolymers of a $C_4$ isomonoolefin derived unit, such as an isobutylene derived unit, and at least one other polymerizable unit.

The term "propylene copolymer" may be used to refer to a random copolymer that is elastomeric, has moderate crystallinity, and possesses propylene-derived units and of from 5 to 50 wt % one or more units derived from ethylene, higher α-olefins and/or optionally diene-derived units.

The term "ethylene copolymer" may be used to refer to a random copolymer that is elastomeric, has moderate crystallinity, and possesses ethylene-derived units and of from 5 to 50 wt % one or more units derived from propylene, higher α-olefins and/or optionally diene-derived units.

The term "bulk phase" for an elastomer means an elastomer, or an elastomer blended with a plasticizing liquid, in a solid phase having a kinetic viscosity under zero shear at room temperature in the range of 103 to 109 Pa-sec. In any embodiment of the invention, the bulk phase elastomer may alternatively have a kinetic viscosity under zero shear at room temperature in the range of 104 to 109 Pa-sec. The term "bulk phase" may also be used to refer to a polymer mass containing less than 30 wt % of solvent and/or diluent.

The term "kneader" may be used to refer to any means adapted for kneading. The term kneader may be used synonymously with, but is not limited to, a "kneader vessel".

The term "hook" may be used to refer to a material, e.g., metal, adapted for catching, pulling, or grabbing, preferably in a curved or bent shape.

The term "flight" may be used to refer to a grouping or series of paddles or hooks along a common line or angle relative to a shaft assembly extending longitudinally down the axial portion of the shaft assembly.

The term "physically-distinct constituents" refers to those materials that can be separated by squeezing and compacting actions and/or the combination of conveying action working against gravitational forces taking place within a deliquifying section or deliquifying-compaction section.

The term "pseudo-liquid phase" refers to a rheological state of a polymer in which the polymer either has (i) a crossover angular frequency ($\omega_c$) of greater than or equal to 1 rad/s or (ii) a w of less than 1 rad/s and a plateau modulus ($G_N$) of less than $1.2\times10^5$ Pa.

The term "plasticizing liquid" refers to a hydrocarbon liquid or oil that is capable of swelling or softening the olefinic-based polymers described herein. The plasticizing liquids desirably do not appreciably react with the polymers or functionalizing agents described herein. In any embodiment, plasticizing liquids may include hydrocarbon liquids having the formula $C_xH_y$, wherein x is 5 to 20, and y is 12 to 42, such as hexane, isohexane, pentane, isopentane, and cyclohexane.

The term "neutralization compounds," which may also be referred to as "neutralizers," refers to those compounds that react or interact with reaction by-products from the processes of this invention for the purpose of preventing or minimizing undesirable attributes of these by-products. For example, neutralization compounds may be used to react or interact with hydrogen bromide. Exemplary neutralization compounds include, but are not limited to, alkali and alkaline earth carboxylates (e.g., calcium and sodium stearate), hydroxides (e.g., magnesium hydroxide), oxides (e.g., magnesium oxide), epoxides, epoxidized esters such as $C_8$-$C_{24}$ epoxidized esters, epoxidized soybean oil, and inorganic salts of organic acids.

The term "stabilization compounds," which may also be referred to as "stabilizers," refers to those compounds that can be introduced to the olefinic-based polymers described herein for the purpose of preventing or minimizing undesirable reactions or interactions that the olefinic-based polymers can undergo. For example, stabilizers may include antioxidants such as, but not limited to hindered phenols such as butylated hydroxytoluene (BHT), secondary aromatic amines, benzofuranones, and hindered amine light stabilizers (HALS). Other stabilizers may include ionomer stabilizer(s), which refers to any organic proton donor such as carboxylic acids (e.g., fatty acids such as stearic acid), mineral and organic acids having pKa less than 9.0 (e.g., phenol, citric acid, monopotassium phosphate, and perchloric acid), and polymer resins with acidic functional groups. Still other stabilizers include free radical scavengers including sterically hindered nitroxyl ethers and sterically hindered nitroxyl radicals, such as those described in WO 2008/003605A1.

Aspects of the present invention can be described with reference to FIG. 1, which shows polymerization zone 100, devolatilization zone 300 downstream of polymerization zone 100 and in fluid communication with polymerization zone 100 via line 130, and functionalization zone 400 downstream of devolatilization zone 300 and in fluid communication with devolatilization zone 300 via line 140. Typically, a monomer mixture stream comprising monomer and optionally one or more comonomers is conducted via line 110 to polymerization zone 100, and a catalyst stream is conducted via line 120 to polymerization zone 100. Alternatively, the monomers and/or components of a catalyst stream can be mixed and introduced as non-reactive streams.

Monomer Mixture

The composition of the monomer mixture conducted to polymerization zone 100 is dependent upon the desired structure of the polymer produced by polymerizing the monomer mixture. Generally, the produced polymer comprises an olefinic-based polymer, more preferably an olefinic-based elastomer. In such aspects, the monomer mixture typically comprises at least one olefinic monomer and optionally one or more comonomers copolymerizable therewith.

Suitable olefinic monomers include, but are not limited to, monoolefins and multiolefins. Exemplary monoolefins include, but are not limited to, normal olefins such as ethylene and propylene, and isoolefins such as isobutylene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. Suitable multiolefins may be aliphatic or aromatic. Exemplary multiolefins include, but are not limited to isoprene, butadiene, 2,3-dimethyl-1,3-butadiene, myrcene, 6,6-dimethyl-fulvene, hexadiene, cyclopentadiene, piperylene, alloocimene, and other monomers (e.g., alkylstyrenes) such as disclosed in U.S. Pat. No. 5,506,316.

Preferably, the produced olefinic-based elastomer comprises an isoolefin-based elastomer, ideally an isobutylene-based elastomer. In such aspects, the monomer mixture typically comprises at least one $C_4$ to $C_7$ olefin monomer, preferably a $C_4$ to $C_7$ isoolefin monomer. Often, the monomer mixture comprises at least one $C_4$ to $C_7$ isoolefin monomer and at least one multiolefin monomer. Often, the monomer mixture comprises two or more $C_4$ to $C_7$ olefin monomers, preferably two $C_4$ to $C_7$ isoolefin monomers, ideally two $C_4$ to $C_7$ monoolefin monomers. Optionally, the monomer mixture may comprise additional comonomers. Preferred optional additional comonomers include, but are not limited to, non-conjugated aliphatic dienes, non-isoprene conjugated aliphatic dienes, aromatic dienes, aryl monomers, and combinations thereof. In particular aspects, the produced olefinic-based elastomer is obtained by polymerizing a monomer mixture including at least 80%, or at least 86.5%, or alternatively up to 95 wt % of $C_4$ to $C_7$ isoolefin monomer and about 5% to about 20 wt % alkylstyrene monomer.

Alternatively, the produced olefinic-based elastomer comprises a propylene or ethylene copolymer. In such aspects, the monomer mixture typically comprises propylene and/or ethylene, optionally a $C_4$ to $C_{10}$ α-olefin, and optionally a diene component. Preferred $C_4$ to $C_{10}$ α-olefins include, but are not limited to, 1-butene, 1-hexene, and 1-octene. Preferably, the diene component is non-conjugated. Preferred non-conjugated diene components include, but are not limited to 1,4-hexadiene, 1,6-octadiene, 5-methyl-1,4-hexadiene, 3,7-dimethyl-1,6-octadiene, dicyclopentadiene ("DCPD"), ethylidiene norbornene ("ENB"), norbornadiene, 5-vinyl-2-norbornene ("VNB"), and combinations thereof.

Catalyst

Referring back to FIG. 1, one or more catalysts and/or catalyst components are conducted to polymerization zone 100. The selected catalysts and/or catalyst components is dependent upon the desired structure of the polymer produced by polymerizing the monomer mixture. In any embodiment, the one or more catalysts and/or catalyst components may be supported (i.e., heterogeneous) or soluble (i.e., homogeneous). Suitable catalysts and catalyst components include Ziegler-Natta catalysts, ideally metallocene catalysts, Lewis Acid catalysts, and Friedel-Crafts catalysts.

Polymerization Zone

Continuing with reference to FIG. 1, the monomer mixture and one or more catalysts and/or catalyst components are transferred to polymerization zone 100. Preferably, polymerization zone 100 is adapted to advantageously synthesize and isolate multi-phase compositions, such as those formed in slurry polymerization processes.

Generally, polymerization zone 100 is comprised of operationally distinct sections. While each section is adapted to convey the contents of polymerization zone 100 with a positive overall net flow forward, each section is uniquely adapted to impart intended forces on the contents therein to thereby accomplish distinct goals. Typically, the operationally distinct sections include a mixing section wherein the monomer mixture, catalyst(s), polymer product(s), and optional diluents are mixed, back mixed, and/or kneaded to form a polymerization mixture comprising an olefinic-based polymer, a deliquifying section wherein physically-distinct constituents of the polymerization mixture can be separated, and a quenching section wherein the contents thereof are mixed while introducing a quenching agent. Optionally, polymerization zone 100 may comprise further sections including, but not limited to a compaction section where the contents thereof can undergo compaction forces, one or more conveying sections adapted primarily to convey the contents thereof, one or more sealing sections adapted to restrict flow of material within the section and fill any voids to thereby create a seal between the section immediately upstream of the sealing section and the other downstream sections, and/or a devolatilization section adapted to subject the contents thereof to reduced pressure and/or increased temperatures to thereby volatilize lower-boiling constituents within the devolatilization section and separate them from the other constituents. Often, one or more operationally distinct sections of polymerization zone 100 may be configured to perform multiple of the aforementioned functions. For example, polymerization zone 100 may comprise a deliquifying-compaction section that is configured to both separate physically-distinct constituents of the polymerization mixture as well as to subject the contents thereof to compaction forces. In any embodiment, polymerization zone 100 preferably has at least one section with a defined cross-sectional area that continually decreases from a first end to a second end of the section.

Each of the operationally distinct sections of polymerization zone 100 may be housed in any vessel or combination of vessels adapted to perform the section's respective function(s), any of which vessels may be equipped with one or more temperature control devices and/or one or more pressure control devices. Typically, at least one vessel within polymerization 100 is a polymerization reactor. Preferably, the polymerization reactor includes housing and a rotatable shaft assembly positioned axially within the housing.

Preferably, the mixing section is housed within the polymerization reactor and has a generally cylindrical housing, an inlet proximate to a first end, and an outlet proximate to an opposed second end. Typically, the mixing section includes at least two shearing paddles extending radially from the rotatable shaft of the reactor. Alternatively or additionally, the mixing section may include at least two kneading hooks fixed to the mixing section housing and extending inwardly toward the rotatable shaft of the reactor.

Often, the deliquifying section and optionally a compaction section are also housed within the polymerization reactor. Typically, the deliquifying section of the polymerization reactor has a generally frustoconical housing having a first end larger than the second end. Preferably, the larger first end constitutes an inlet to the deliquifying section and an outlet is located at the second end of the deliquifying section. Ideally, the inlet to the deliquifying section is coextensive with the opposed second end of the mixing section. Typically, the deliquifying section includes at least one generally helical flight extending radially from the rotatable shaft of the reactor. Where the deliquifying section is housed with the polymerization reactor, polymerization zone 100 generally includes a material discharge apparatus downstream of the reactor. In such aspects, the quenching section is generally housed within the material discharge apparatus.

Where the deliquifying section is not housed with the polymerization reactor, polymerization zone 100 preferably includes a deliquifying-quench extruder located downstream of the reactor. Generally, the deliquifying-quench extruder includes housing and a shaft assembly positioned axially within the extruder, where the shaft assembly includes multiple helical flight configurations. In such aspects, the extruder includes multiple processing sections defined by the multiple flight configurations, such as the deliquifying section, quenching section, and optionally a compaction section. Optionally, the deliquifying section of the extruder may also function as a compaction section (i.e., the extruder includes a combination deliquifying-compaction section).

Figure 2A:
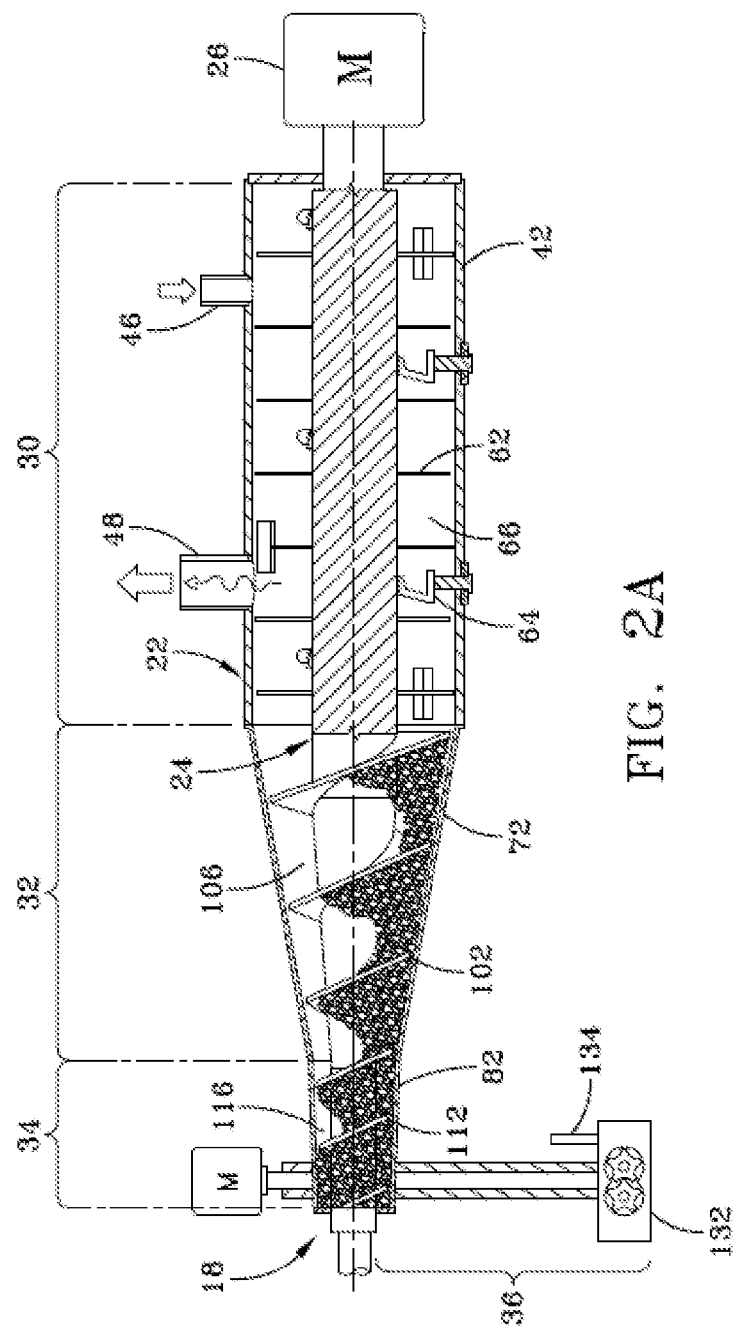
FIG. 2A is a cross-sectional schematic representation of a first polymerization zone.
Figure 2B:
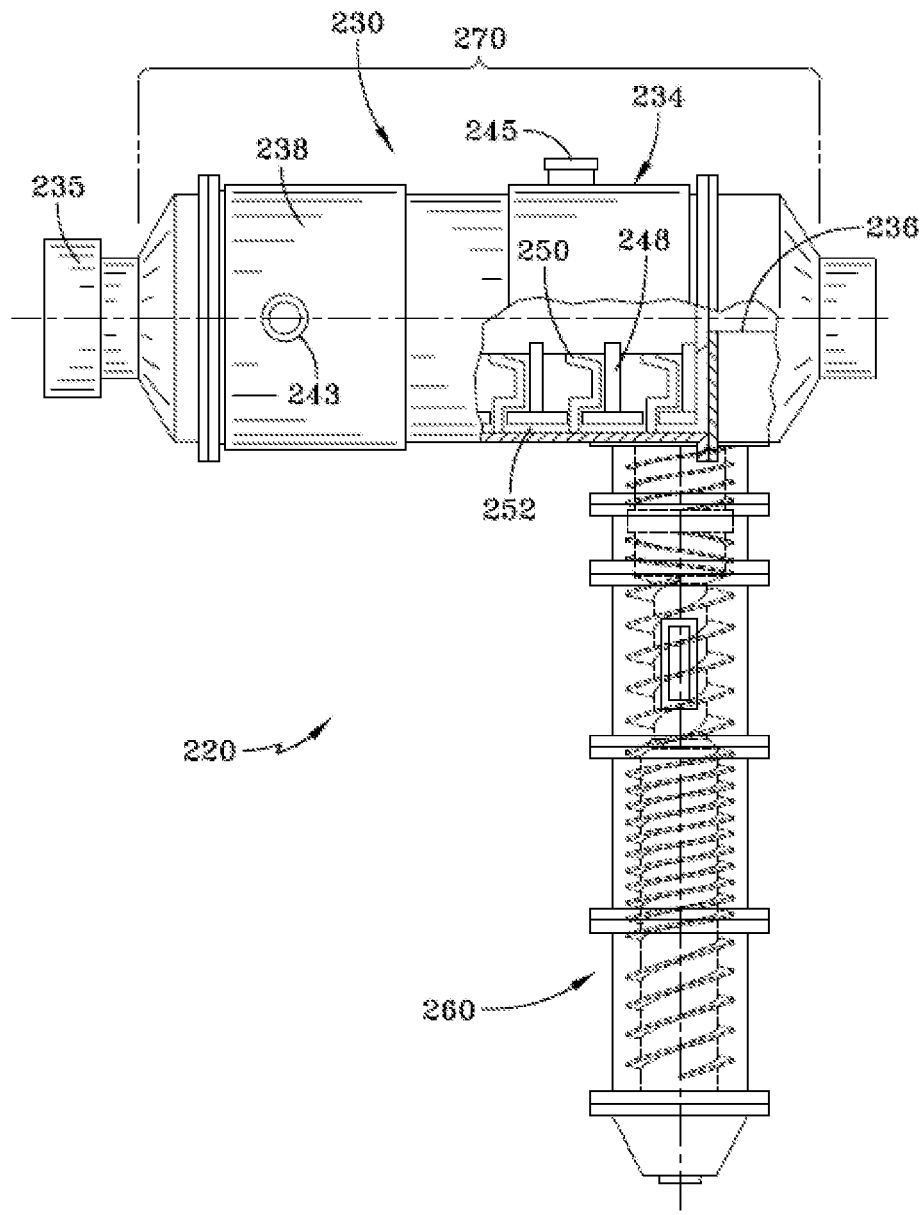
FIG. 2B is an overhead perspective view of a second polymerization zone.
Figure 2B:
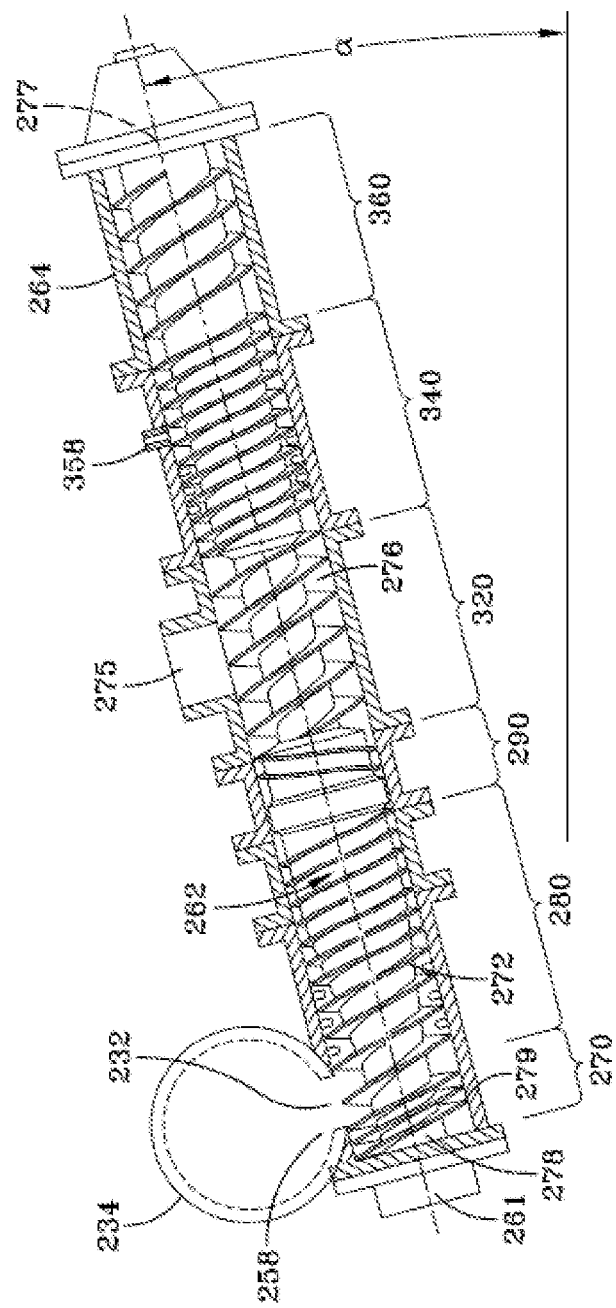

Two suitable configurations for polymerization zone 100 are illustrated in FIGS. 2A, 2B, and 2B'. A first polymerization zone configuration comprising a mixing section, deliquifying section, and compaction section housed within reactor 18, which may also be referred to as polymerization reactor 18, and a quenching section housed in material discharge apparatus 132 downstream of reactor 18 can be described with reference to FIG. 2A.

Reactor 18 generally includes housing 22 and a shaft assembly 24 positioned axially within housing 22. Housing 22 includes side wall 42, side wall 72, and side wall 82. In any embodiment, shaft assembly 24 may be rotatable and may be suitably supported for rotation by the use of bearings, which are not shown. Shaft assembly 24 may be mechanically attached to a suitable drive source 26 for rotating shaft 24 at a desired speed. Often, shaft 24 is mechanically attached to a single drive source as shown in FIG. 2A, and alternatively, shaft 24 is mechanically attached to two distinct drive sources at opposing ends of shaft 24.

Mixing section 30 of reactor 18 is adapted to mix, back mix, and/or knead the contents of the reactor and thereby create relatively high surface contact between the contents of the reactor and the mixing elements within the reactor. Housing 22 includes side wall 42 within mixing section 30. Side wall 42 and/or an end wall of reactor 18 within mixing section 30 may include one or more openings. For example, as shown in FIG. 2A, inlet 46 is provided in side wall 42 radial to shaft assembly 24. Side wall 42 and/or an end wall of reactor 18 within mixing section 30 may include one or more outlets. For example, and as shown in FIG. 2A, outlet 48 is provided within side wall 42 radial to shaft assembly 24. Often, outlet 48 is adapted to allow removal of a vapor stream from the reactor, which can thereby provide for the evaporative cooling of the materials within the reactor. As will be appreciated by the skilled person, the location of the inlets and outlets can be varied based upon preference. For example, it may be desirable to include an inlet or outlet (not shown) within an end wall of reactor 18.

Preferably, the desired mixing and kneading within mixing section 30 is accomplished through a hook and paddle kneading arrangement. For example, mixing section 30 may include two or more kneading paddles. Shaft assembly 24 may include one or more flights of paddles, e.g., 62, extending radially from the axial portion of the shaft assembly. Often, shaft assembly 24 may include 3 to 10 flights of paddles within mixing section 30, or alternatively 4 to 8 flights within mixing section 30. In any embodiment, each flight of paddles may contain at least 1 and up to 100 paddles, or each flight may contain 1 to 20 paddles, or each flight may contain 2 to 10 paddles, or each flight may contain 2 to 8 paddles.

In any embodiment, paddle 62 is configured and arranged to operate in conjunction with hook 64 that is fixed to side wall 42 of mixing section 30. Preferably, as shaft assembly 24 rotates, paddle 62 passes adjacent to hook 64. Hooks, e.g., 64, are also arranged in flights along the axial length of mixing section 30. The number of flights of hooks may depend on a variety of factors including the number of paddles in each flight of paddles.

A space 66, which may also be referred to as channel 66, exists between shaft assembly 24 within mixing section 30 (i.e., the axial portion and paddle 62), and the inner diameter of side wall 42, as well as hook 64. Preferably, side wall 42 is generally cylindrical and therefore the cross-sectional area (i.e., the area transverse to shaft assembly 24) is constant or substantially constant through the axial length of mixing section 30.

Deliquifying section 32 of reactor 18 is adapted to separate physically-distinct constituents within the contents of the reactor and allow one of the constituents to migrate or flow back to mixing section 30. For example, solids can be separated from liquids within deliquifying section 32. Likewise, viscous liquids can be separated from less viscous liquids within deliquifying section 32. Housing 22 includes side wall 72 within deliquifying section 32. Shaft assembly 24 within deliquifying section 32 includes helical flight(s) 102 extending therefrom. A space 106, which may also be referred to as channel 106, exists between shaft assembly 24 within deliquifying section 32 (i.e., the axial portion and helical flight 102), and the inner diameter of side wall 72. Often, the separation of physically-distinct materials can be accomplished, at least in part, through a gap that may present between the tip of helical flight 102 and the inner diameter of side wall 72. In any embodiment, helical flight 102 can be adapted to permit the flow of liquid back to mixing section 30.

Channel 106 may be defined by its cross-sectional area (transverse to the axial length of shaft assembly 24) at any point along the length of shaft assembly 24 within deliquifying section 32. Typically, the cross-sectional area of channel 106 at the first end of deliquifying section 32 is greater than the cross-sectional area of channel 106 at second end of deliquifying section 32. Ideally, cross-sectional area of channel 106 continuously decreases from the first end of the section to the second end of the section. The rate of decrease from the first end to the second end of the section may be constant or variable. As the skilled person will appreciate, this decrease in the cross-sectional area of channel 106, together with forces of gravity, will promote the back flow of liquids from deliquifying section 32 to mixing section 30. Back flow of liquids may be aided by placing reactor 18 at a tilt angle α relative to the horizontal plane. Generally, and as shown in FIG. 2A, the reduction in the cross-sectional area of channel 106 from the first end to the second end of the section may be accomplished by employing a frusto-conical side wall 72 within deliquifying section 32.

Compaction section 34 of reactor 18 is adapted to compact the materials within this section (i.e., the section is adapted to create pressure); the compaction may be equated with squeezing of the materials to remove or release liquids or gases from the materials. Housing 22 includes side wall 82 within compaction section 34. As with deliquifying section 32, shaft assembly 24 within compaction section 32 may include helical flight(s) 112 extending therefrom. A space 116, which may also be referred to as channel 116, exists between shaft assembly 24 within compaction section 34 (i.e., the axial portion and helical flight 112), and the inner diameter of side wall 82. As with deliquifying section 32, channel 116 within third portion 34 may be defined by its cross-sectional area (transverse to the axial length of shaft assembly 24) at any point along the length of shaft assembly 24 within compaction section 34.

The compaction within compaction section 34 may be accomplished in several ways. For example, the average cross-sectional area of channel 116 within compaction section 34 may be smaller than the average cross-sectional area of channel 106 within deliquifying section 32. Compaction may also be accomplished through the relative spacing of flights 112 within compaction 34.

Often, cross-sectional area of channel 116 within third portion 34 decreases from the first end to the second end of the section. Alternatively, cross-sectional area of channel 116 within third portion 34 is constant or substantially constant from the first end to the second end of the section.

Quenching section 36, housed within material discharge apparatus 132, is adapted to mix the contents of the section while introducing a quenching agent. As shown in FIG. 2A, the material discharge apparatus 132 may be, e.g., a twin screw extruder. In such aspects, the mixing within quench section 36 comprises extrusion mixing. In any embodiment, the quenching agent may be introduced into material discharge apparatus 132 via port 134.

The polymerization zone configuration depicted in FIG. 2A can be further understood with reference to commonly assigned WO 2016/069,121 which is hereby incorporated by reference.

A second suitable polymerization zone configuration 220 comprising a mixing section housed within reactor 230, which may be referred to as polymerization reactor 230, and a combination deliquifying-compaction section and quenching section housed in extruder 260, which may be referred to as deliquifying-quench extruder 260, downstream of reactor 230 can be described with reference to FIGS. 2B and 2B'. In addition to these sections, extruder 260 of this second configuration includes two conveying sections, a sealing section, and a devolatilization section. As best shown in FIG. 2B', reactor 230 is in fluid communication with extruder 260 via an outlet opening 232 of reactor 230 and an inlet opening 258 of extruder 260. Outlet opening 232 may be directly mated to inlet opening 258. Alternatively, outlet opening 232 may be connected to inlet opening 258 through appropriate conduit (not illustrated). As a result of this configuration, materials within reactor 230 can be transferred to extruder 260 for further processing. Moreover, this configuration allows for the bidirectional flow of materials between reactor 230 and extruder 260.

As shown in FIG. 2B, reactor 230 generally includes housing 234 and a shaft assembly 236 positioned axially within housing 234. Housing 234 includes side wall 238. In any embodiment, shaft assembly 236 may be rotatable and may be suitably supported for rotation by the use of bearings, which are not shown. Shaft assembly 236 may be mechanically attached to a suitable drive source 235 for rotating shaft assembly 236 at a desired speed. Often, shaft assembly 236 is mechanically attached to a single drive source as shown in FIG. 2B, and in alternative configurations not shown, shaft assembly 236 may be mechanically attached to two distinct drive sources at opposing ends of shaft 236.

Mixing section 270, housed within the entire length of reactor 230, is adapted to mix, back mix, and/or knead the contents of reactor 230 and thereby create relatively high surface contact between the contents of the reactor and the mixing elements within the reactor. Side wall 238 and/or an end wall of mixing section 270 may include one or more openings. For example, as shown in FIG. 2B, inlet 243 is provided in side wall 238 radial to shaft assembly 236. Likewise, side wall 238 and/or an end wall of mixing section 270 may include one or more outlets. For example, and as shown in FIG. 2B, outlet 245 is provided within side wall 238 radial to shaft assembly 236. Often, outlet 245 is adapted to allow removal of a vapor stream (also referred to as gaseous stream) from the reactor, which can thereby provide for the evaporative cooling of the materials within the reactor.

Preferably, the desired mixing, kneading and/or granulating within mixing section 270 is accomplished through a hook and paddle kneading arrangement. For example, mixing section 270 may include two or more kneading paddles. Shaft assembly 236 may include an axial portion and one or more flights of paddles 248 extending radially from the axial portion of the shaft assembly. In any embodiment, shaft assembly 236 may include 3 to 10 flights of paddles, or alternatively 4 to 8 flights. Generally, each flight of paddles may contain at least 2 and up to 20 paddles.

In any embodiment, paddle 248 is configured and arranged to operate in conjunction with hook 250 that is fixed to side wall 238. Typically, as shaft assembly 236 rotates, paddle 248 passes adjacent hook 250. Hooks, e.g., 250, are also arranged in flights along the axial length of reactor 230. The number flights of hooks may depend on a variety of factors including the number of paddles in each flight of paddles.

A space 252, which may also be referred to as channel 252, exists between shaft assembly 236 (i.e., the axial portion and paddle 248), and the inner diameter of side wall 238, as well as hook 250. Preferably, side wall 238 is generally cylindrical and therefore the cross-section area (i.e., the area transverse to shaft assembly 236) is constant or substantially constant through the axial length of mixing section 270.

Turning now to deliquifying-quench extruder 260, reference can be made to FIG. 2B', which shows extruder 260 including housing 264 and shaft assembly 262. Housing 264 includes side wall 268. Side wall 268 and/or an end wall of extruder 260 may include one or more openings. For example, an outlet opening 277 is provided within an end wall of extruder 260. As noted above, extruder 260 includes inlet opening 258 within housing 264. Additional inlets, not shown, may also be provided in side wall 268. Likewise, side wall 268 and/or an end wall of extruder 260 may include one or more outlets. For example, outlet 275 is provided within side wall 268. Often, outlet 275 is adapted to allow for the removal of a gaseous stream from extruder 260, which gaseous stream can be initiated through, for example, a vacuuming of at least a portion of extruder 260. Preferably, side wall 268 is generally cylindrical and therefore the cross-section area (i.e., the area transverse to shaft assembly 262) is constant or substantially constant through the axial length of extruder 260.

Shaft assembly 262 includes a screw element(s) (e.g., 272 as will be described below) that is carried by and driven by a core shaft (not illustrated). In any embodiment, the core shaft, and therefore shaft assembly 262, may be rotatable and may be suitably supported for rotation by the use of bearings, which are not shown. The core shaft may be mechanically attached to a suitable drive source 261 for rotating shaft assembly 262 at a desired speed. Often, the core shaft is mechanically attached to a single drive source, and in other configurations not shown, the core shaft may be mechanically attached to two distinct drive sources at opposing ends of the core shaft.

Within each operationally distinct section, screw element 272 includes a helical element having one or more flights, where the flight includes a flight base 278 and flight tip(s) 279. A space 276, which may be referred to as a channel 276, exists within the interstices of screw element 272. Channel 276 can be characterized based upon the cross-sectional area at any point along the axis of shaft assembly 262, which cross-sectional area is generally in the form of an interrupted annulus. As the skilled person will appreciate, the cross-sectional area is a function of the channel depth, which is the difference between the root diameter (which is defined by the diameter of flight base 278) and the crest diameter, which may also be referred to as the flight diameter (which is defined by the diameter of flight tips 279). Channel 276 can also be characterized based upon the width of the respective channels (also referred to as flight pitch), which is the distance between the respective flight tips 279.

A first conveying section 270 of extruder 260 is adapted to aggressively convey materials away from the first wall of extruder 260, and towards deliquifying-compaction section 280. As shown in FIG. 2B', screw element 272 within first conveying section 270 includes a helical element having one or more flights, where the flight includes a flight base 278 and flight tip(s) 279. Generally, the skilled person will appreciate that the conveying requirements of first conveying section 270 can be met with conventional designs with relatively high distance between flight tips 279 that can serve to generate enough pressure to force the materials within first conveying section 270 away from the first end of the section to the second end of this section.

Deliquifying-compaction section 280 is adapted to separate physically-distinct constituents within the contents of extruder 260 and allow one of the constituents to migrate or flow (as in the case of a liquid) back toward inlet 258. Accordingly, deliquifying-compaction section 280 is adapted to provide bidirectional flow of materials. For example, solids can be separated from liquids within deliquifying-compaction section 280. Likewise, viscous liquids can be separated from less viscous liquids within deliquifying-compaction section 280.

As generally shown in FIG. 2B', the channel depth of channel 276 decreases from the first end to the second end of deliquifying section 280. Preferably, the rate of channel depth decrease is smooth and continuous. In any embodiment, the rate of decrease may be defined in terms of the ratio of the cross-sectional annular area at the first end of the section to the cross-sectional annular area at the second end. For example, the rate of decrease may be represented by a ratio of cross-sectional area at the first end to the cross-sectional area at the second end of from 1.2:1 to 5:1.

Thus, as a result of the decrease in channel depth and flight pitch through deliquifying-compaction section 280, materials being processed within deliquifying-compaction section 280 undergo increased pressure resulting in the squeezing and compaction of the materials as the materials are moved from the first end to the second end of the section by operation (i.e., rotation) of screw element 272. Back flow of liquids may be aided by placing extruder 260 at a tilt angle α relative to the horizontal plane.

Sealing section 290 of extruder 260 is adapted to fill any voids within this section to thereby create a seal between deliquifying-compaction section 280 and the other downstream portions of extruder 260, such as devolatilization section 320. Generally, the skilled person will appreciate that the sealing requirements of sealing section 290 can be met by creating a relatively narrow or small dam channel within this section, such that materials being conveyed into sealing section 290 from deliquifying-compaction section 280 will be tightly compacted within the dam channel and thereby form a seal that separates materials within deliquifying-quench section 280 from materials within downstream portions such as devolatilization section 320.

Devolatilization section 320 of extruder 260 is adapted to provide a low pressure zone, which low pressure can positively prevent or inhibit backward flow of materials from flowing upstream across sealing section 290, to provide evaporative cooling of materials within devolatilization section 320, and to disengage materials having a lower vapor pressure from those materials having a higher vapor pressure.

As the skilled person will appreciate, at a given shaft speed, the channel depth and flight pitch determine the conveying capacity within any section of extruder 260. The channel depth and flight pitch within devolatilization section 320, especially with respect to the adjacent portions (e.g., sealing section 290 and quenching section 340), provide a relatively high conveying capacity, which ensure that this portion of extruder 260 can operate partially filled and thereby maintain a head space. Stated another way, devolatilization section 320 is designed to push or convey material at a faster rate than material is fed to devolatilization section 320. As a result of this, materials having a lower vapor pressure can be disengaged from those materials having a higher vapor pressure through the assistance of the head space.

Devolatilization section 320 may include an opening, e.g., opening 275, which allows for the removal volatile materials from devolatilization section 320, such as those volatile materials disengaged from the less volatile materials as described above.

Quenching section 340 is adapted to vigorously mix the materials within extruder 260 and thereby allow for the rapid dispersion of additives, such as quenching agents, that can be introduced within extruder 260 at quenching section 340.

In any embodiment, vigorous mixing may be provided by the shallow depth of channel 276 within quenching section 340, as well as relatively low flight pitch, which the skilled person appreciates will provide for relatively slow velocity of material in positive, downstream direction, thereby increasing the mixing time within quenching section 340. Additives can be introduced into quenching section 340 through one or more inlets, such as inlet 358.

While the desired vigorous mixing within quenching section 340 can be accomplished as set forth above (i.e., shallow channel depth and shallow flight pitch), the skilled person can use multiple alternative configurations to achieve the desired high shear mixing. As suggested above, the intense mixing within quenching section 340 allows for rapid and intimate mixing of additive materials with the materials being processed within extruder 260, while maintaining adequate conveying in a downstream direction.

Conveying section 360 is adapted to convey materials being processed within extruder 260 out of extruder 260. Generally, the skilled person will appreciate that the conveying requirements of this section can be met with conventional designs with relatively high flight pitch that can serve to generate enough pressure to force the materials within extruder 260 out of outlet 277.

The polymerization zone configuration depicted in FIG. 2B can be further understood with reference to commonly assigned PCT Application No. PCT/US2016/041462, filed Jul. 8, 2016, which is hereby incorporated by reference.

Irrespective of the configuration selected for polymerization zone 100, processes for the production of functionalized olefinic-based polymer employing the synthesis systems of this invention each typically comprise first polymerizing the monomer mixture to form a polymerization mixture and then subjecting the polymerization mixture to a series of sequential steps that serve to ultimately provide a stable polymer product that is isolated from the other constituents of the polymerization mixture. More particularly, the polymerization mixture is generally subjected to a deliquifying step and a quenching step. Often, the polymerization mixture is also subjected to a compaction step and/or a devolatilization step.

During these inventive processes, polymerization reactants (e.g., the monomer mixture), catalysts and/or catalyst components, and optionally solvents or diluents are generally first charged to a polymerization reactor in a materials input step. These various materials can be charged to the reactor using conventional feed equipment. Once inside the reactor, the reactants are mixed and/or kneaded while undergoing reaction (e.g., polymerization) within a mixing step to form a polymerization mixture that includes polymer product, preferably in a granulated state. Preferably, the polymerization is performed in at least one of a solution and a slurry (suspension) system. In such aspects, the polymerization is performed in the presence of at least one inert diluent. Suitable inert diluents include, but are not limited to alkanes, chloroalkanes, cycloalkanes, aromatics, HFC's and HFO's. Often the diluent is mono- or polysubstituted with halogens. Ideally the diluent is methyl chloride. Alternatively the polymerization may be performed in the absence of diluent in the bulk phase or substantially in the bulk phase.

Typically, the monomer mixture is polymerized at temperatures within the range from about −150° C. to about 100° C. Where the produced olefinic-based polymer comprises an isoolefin-based elastomer, the monomer mixture is preferably polymerized within the range from about −100° C. to about 0° C., more preferably from about −80° C. to about −40° C. and ideally within the range from about −60° C. to about −50° C. Where the produced olefinic-based polymer comprises a propylene or ethylene-based copolymer, the monomer mixture is preferably polymerized within the range from about −20° C. to about 175° C., more preferably from about −10° C. to about 150° C., and ideally from about 0° C. to about 80° C. In any embodiment, the monomer mixture is preferably polymerized at a pressure within the range from about 0.1 bar to about 100 bar.

The polymerization mixture is often subjected to further processing steps within the polymerization reactor. In such aspects, the polymerization mixture conveyed to a deliquifying section within the reactor where the solids and/or viscous liquid component of the polymerization mixture is at least partially separated from the diluent and the diluent is allowed to flow back to the mixing section. The polymerization product may be then be conveyed to compaction section within the reactor where squeezing forces reduce and eliminate polymerization product voids and free space within this zone and further drive out diluents from the polymerization product. Conveying forces and material flow then forces discharge of the product from the reactor, preferably in a granulated state. Optionally, the discharge of the product from the reactor is assisted by a material discharge apparatus, such as a downstream extruder. In any embodiment, the polymerization mixture may be subjected to a quenching step in which quenching agents are charged within the material discharge apparatus.

Alternatively, the polymerization mixture is subjected to further processing steps within a deliquifying-quench extruder by subjecting the polymerization mixture, or a portion thereof, to a sequential series of steps including (a) compacting and deliquifying the polymerization mixture in a deliquifying-compaction step to force diluent entrained within the polymer to separate from the polymer while permitting bidirectional flow whereby the polymer is conveyed in one direction while the diluent is allowed to flow in an opposite direction, (b) subjecting the polymer to reduced pressures in a devolatilization step to thereby volatilize at least a portion of any diluent or monomer entrained within the polymer, (c) introducing a quenching agent in a quenching step to the polymer while subjecting the polymer to shear and mixing, and (d) conveying the polymer out of the deliquifying-quench extruder.

Once discharged from the material discharge apparatus or deliquifying-quench extruder, the polymer product is conducted out of polymerization zone 100 via line 130 to be further subjected to downstream finishing and/or modification steps, such as devolatilization zone 300 and functionalization zone 400, as described below.

Devolatilization Zone

Referring back to FIG. 1, a stream comprising olefinic-based polymer is typically conducted away from the polymerization zone via line 130 to devolatilization zone 300. Generally, the devolatilization zone comprises at least one extruder or kneader adapted to subject the contents thereof to reduced pressures and/or increased temperatures to thereby volatilize lower-boiling constituents within the devolatilization zone and separate them from the other constituents to produce olefinic-based polymer in the bulk phase.

Functionalization Zone

Figure 3:
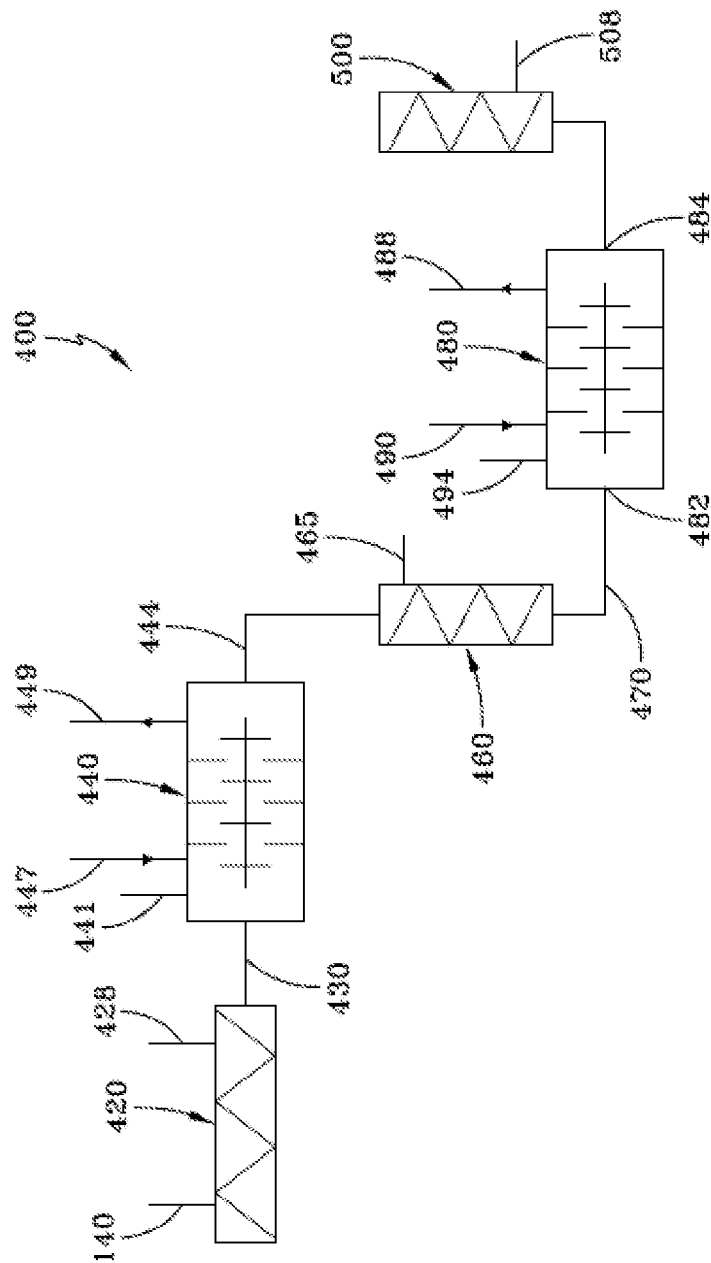
FIG. 3 is a schematic diagram of a functionalization zone and functionalization process.

Continuing with reference to FIG. 1, a stream comprising olefinic-based polymer in the bulk-phase is conducted away from devolatilization zone 300 via line 310 to functionalization zone 400. A suitable configuration for functionalization zone 400 can be described with reference to FIG. 3. FIG. 3 shows functionalization zone 400 including first extruder 420, first kneader 440 downstream of first extruder 420 and in fluid communication with first extruder 420, second extruder 460 downstream of first kneader 440 and in fluid communication with first kneader 440, second kneader 480 downstream of second extruder 460 and in fluid communication with second extruder 460, and third extruder 500 downstream of second kneader 480 and in fluid communication with second kneader 480. As shown in FIG. 3, the various components of functionalization zone 400 are interconnected using appropriate conduit. Alternatively, two or more of the components may be directly connected to each other. Any of these components may be equipped with one or more temperature control devices and/or one or more pressure control devices Generally, first kneader 440 and second kneader 480 are adapted to process bulk-phase olefinic-based polymer in sequence. First kneader 440, which may be referred to as reactor kneader 440, is typically adapted to serve as a reaction vessel for a reaction in which olefinic-based polymer is reacted with a functionalizing agent. Second kneader 480, which may be referred to as by-product removal kneader 480, is adapted to further process the functionalized polymer produced in first kneader 440 and separate reaction byproducts from the functionalized polymer.

As indicated above, first and second kneaders 440 and 480 process bulk-phase olefinic-based polymer. A plasticizing agent is often added to aid in processing the olefinic-based polymer. Alternatively, the bulk-phase olefinic-based polymer may be substantially devoid of plasticizing liquid, where substantially devoid refers to that amount or less of plasticizing liquid that does not have an appreciable impact on the practice of this invention.

First kneader 440 may be fed at inlet 442 by first extruder 420. Typically, the arrangement and operation of first extruder 420 is designed to accomplish several goals. To begin with, first extruder 420 is arranged and operated to convert the olefinic-based polymer, which may be fed to extruder 420 through inlet 422, into a compacted, continuous solid mass that occupies the entire cross-sectional area of at least a portion of conduit 430 feeding first kneader 440 at inlet 442. As a result, the polymer being fed to first kneader 440 via conduit 430 serves to seal first kneader 440 at inlet 442. In addition, the extruder may convert the olefinic-based polymer into a pseudo-liquid phase. For example, first extruder 420 is operated to modify the temperature of the rubber to a desired temperature for placing the polymer in the pseudo-liquid phase for processing within first kneader 440. In any embodiment, the temperature may be adjusted to form a cohesive mass of the polymer. Often, first extruder 420 adjusts the temperature of the polymer to a temperature of from about 20 to about 200° C., alternatively from about 40 to about 175° C., and alternatively from about 50 to about 80° C.; the particular temperature range selected will be polymer dependent.

In any embodiment, first extruder 420 may be operated at a rate sufficient to feed the rubber to first kneader 440. Often, the residence time of the rubber within first kneader 440 is at least 2 minutes, alternatively at least 3 minutes, alternatively at least 4 minutes, and alternatively at least 5 minutes. In any embodiment, the residence time within first kneader 440 may be from about 3 to about 15 minutes, alternatively from about 4 to about 12 minutes, and alternatively from about 5 to about 10 minutes.

Embodiments of the invention are not necessarily limited by the construction of first extruder 420. For example, first extruder 420 may be a screw-type extruder, such as a single-screw extruder or a twin-screw extruder. Alternatively, first extruder 420 may be a ring extruder or screw conveyor. In yet other alternatives, first extruder 420 may include a melt pump or gear pump.

In any embodiment, first extruder 420 may include one or more inlets 428 that may be used for the introduction of one or more additive materials into first extruder 420 and/or plasticizing liquids. Such additive materials may include neutralization compounds, stabilization compounds, or both neutralization and stabilization compounds.

As suggested above, first kneader 440 receives polymer through inlet 442 and discharges functionalized polymer through outlet 444. In any embodiment, first kneader 440 may include an inlet 447 for introducing functionalizing agent into first kneader 440, optionally together with a carrier or transfer gas (e.g., nitrogen, argon, carbon dioxide, fluoro- and chloro-carbons and hydrofluoro- and hydrochloro-carbons) when the functionalizing agent is also a gas.

The functionalizing agent may be a halogenating agent, such as a chlorinating agent or a brominating agent. Examples of halogenating agents include, but are not limited to, bromine, chlorine, bromine chloride, sulfuryl bromide, 1,3-dibromo-5,5-dimethylhydantoin, iodobenzene bromide, sodium hypobromite, sulfur bromide and N-bromosuccinimide Additional suitable functionalizing agents include anhydrides, azodicarboxylates, triazoline diones, peracids, ozone, azides, and sulfenyl chloride.

As discussed above, first kneader 440 processes the polymer while the polymer undergoes a reaction with a functionalizing agent. Preferably, the functionalizing agent is a gas-phase reactant that reacts with the polymer, which is in the bulk phase and in a pseudo-liquid phase. In accordance with the preferred operation of the system, the reaction between the functionalizing agent and the polymer takes place at the surface of the polymer or as the functionalizing agent permeates or dissolves into the polymer. In any embodiment, unreacted functionalizing agent, gaseous by-products of the functionalization reaction, and transfer gases can also be removed at an outlet 449. One or more of these gases may also be recycled through a gas loop (not illustrated).

In any embodiment, the temperature of the polymer and/or functionalized rubber within first kneader 440 may be maintained at a temperature of from about 20 to about 200° C., alternatively from about 40 to about 175° C., and alternatively from about 50 to about 80° C.; the particular temperature range selected will be polymer dependent.

In any embodiment, first kneader 440 may be a sealed vessel, which refers to a vessel that can be operated under increased pressures or under vacuum. In any embodiment, first kneader 440 may be operated at pressures of from about 0.5 to about 10 atmospheres (50 to 1015 kPa), alternatively from about 0.8 to about 5 atmospheres (80 to 510 kPa), and alternatively from about 1 to about 2 atmospheres (100 to 205 kPa). Preferably, the temperature and pressure within first kneader 440 is maintained to provide an environment in which a technologically useful amount of the gaseous functionalizing agent(s) are maintained in the gas phase. Likewise, the temperature and pressure within first kneader 440 are typically maintained to provide an environment in which a technologically useful amount of gaseous by-products of the functionalization reaction is maintained in the gas phase.

In order to facilitate the reaction between the polymer and the functionalizing agent, first kneader 440 is adapted to deform the polymer mass and expose unreacted polymer to the functionalizing agent. Stated another way, the polymer mass within first kneader 440 is disrupted and reoriented to thereby provide renewed surface of the solid polymer mass, thereby exposing unreacted polymer to the functionalizing agent.

In any embodiment, the processing and facilitation of the functionalization reaction within first kneader 440 may be provided by an arrangement of kneading elements within first kneader 440. In any embodiment, first kneader 440 may include fixed hooks and rotating paddles. As with the first extruder 420, first kneader 440 may include one or more inlets 441 that may be used to introduce plasticizing liquids or additive compounds (e.g., stabilization and/or neutralization compounds) to the polymer within first kneader 440.

Again, polymer exits first kneader 440 through outlet 444, which is in fluid communication with a second extruder 460. Second extruder 460 is adapted and operated to achieve several goals. To begin with, second extruder 460, which may also be referred to as discharge extruder 460, compacts and accumulates the functionalized polymer product discharged from first kneader 440 to fill a cross-sectional area of second extruder 460, which thereby provides a seal to outlet 444 of first kneader 440. As will be described in greater detail below, second kneader 480 operates at lower pressures than first kneader 440. Also, second extruder 460 operates in conjunction with first extruder 420 to regulate the amount of polymer within first kneader 440.

Second extruder 460 is in fluid communication with second kneader 480 and feeds functionalized polymer to second kneader 480 via inlet 482 through conduit 470. Second extruder 460 is operated at a rate sufficient to feed functionalized polymer to second kneader 480 and maintain the volume of functionalized polymer within second kneader 480 at desired levels. Often, the residence time of the rubber within second kneader 480 is at least 2 minutes, alternatively at least 3 minutes, alternatively at least 4 minutes, and alternatively at least 5 minutes. In any embodiment, the residence time within second kneader 480 may be from about 2 to about 15 minutes, alternatively from about 4 to about 12 minutes, and alternatively from about 5 to about 10 minutes.

Embodiments of the invention are not necessarily limited by the construction of second extruder 460. For example, second extruder 460 may be a screw-type extruder, such as a single-screw extruder or a twin-screw extruder. Alternatively, second extruder 460 may be a ring extruder or screw conveyor. In yet other alternatives, second extruder 460 may include a melt pump or gear pump. In any embodiment, second extruder 460 may include one or more inlets 465 to introduce additive compounds (e.g., stabilization and/or neutralization compounds) or plasticizing liquids into second extruder 460.

Often, the temperature of the functionalized polymer within second kneader 480 is maintained at a temperature of from about 20 to about 200° C., alternatively from about 40 to about 175° C., and alternatively from about 50 to about 80° C.; the particular temperature range selected will be polymer dependent. In any embodiment, second kneader 480 may be a sealed vessel, which refers to a vessel that can be operated under increased pressures or under vacuum. In any embodiment, second kneader 480 may be operated at pressures of less than 1 atmosphere (100 kPa), alternatively less than 0.5 atmosphere (50 kPa), alternatively less than 0.1 atmosphere (10 kPa), alternatively less than 0.07 atmosphere (7 kPa), alternatively less than 0.05 atmosphere (5 kPa), and alternatively less than 0.03 atmospheres (3 kPa). In any embodiment, second kneader 480 may be operated at pressures of from about 0.02 to about 2 atmospheres (2 to 205 kPa), alternatively from about 0.03 to about 1 atmosphere (3 to 100 kPa), and alternatively from about 0.05 to about 0.5 atmospheres (5 to 50 kPa). Preferably, the temperature and pressure within second kneader 480 is maintained to provide an environment in which a technologically useful amount of the gaseous by-products of the functionalization reaction are maintained in the gas phase.

In any embodiment, a second kneader 480 may include outlet 488 through which gaseous by-products of the functionalization reaction, as well as other transfer gases can be removed from second kneader 480. In any embodiment, second kneader 480 may also include optional gas inlet 490 through which transfer gases, such as nitrogen, can be injected into second kneader 480. These transfer gases may be used to facilitate removal of by-product gases through outlet 488. One or more of these transfer gases may also be recycled through a gas loop (not illustrated).

As discussed above, second kneader 480 processes the functionalized polymer in order to separate by-product gases from the functionalized polymer product. As the skilled person appreciates, these by-product gases may include, but are not limited to, hydrogen halides such as hydrogen bromide, hydrogen chloride, and halogenated solvents or diluents.

In order to facilitate the separation of the by-product gases from the functionalized polymer, second kneader 480 is adapted to deform the functionalized polymer mass and expose and thereby promote the release of gaseous materials (e.g., by-product gases or volatized plasticizer/organics used in the system) entrapped or entrained with the solid functionalized polymer mass. In any embodiment, the processing and facilitation of the separation of by-product gases from the functionalized polymer within second kneader 480 may be provided by an arrangement of kneading elements within second kneader 480. In any embodiment, first kneader 480 may include fixed hooks and rotating paddles. Second kneader 480 may include one or more inlets 494 that may be used to introduce plasticizing liquids or additive compounds (e.g., stabilization and/or neutralization compounds) to the polymer within second kneader 480.

Functionalized polymer exits second kneader 480 through outlet 484, which is in fluid communication with a third extruder 500. Third extruder 500 is adapted and operated to achieve several goals. To begin with, third extruder 500 compacts and accumulates the functionalized polymer product discharged from second kneader 480 to thereby fill a cross-sectional area of third extruder 500, which thereby provides a seal to outlet 484 of second kneader 480. This seal serves several purposes. For example, second kneader 480 operates at lower pressures than third extruder 500. Third extruder 500 operates in conjunction with second extruder 460 to regulate the amount of functionalized polymer within second kneader 480.

Embodiments of the invention are not necessarily limited by the construction of the third extruder 500. For example, third extruder 500 may be a screw-type extruder, such as a single-screw extruder or a twin-screw extruder. Alternatively, third extruder 500 may be a ring extruder or screw conveyor. In yet other alternatives, third extruder 500 may include a melt pump or gear pump.

In any embodiment, third extruder 500 may include one or more inlets 508 that may be used to introduce additive materials (e.g., stabilization and/or neutralization compounds) or plasticizing liquids into third extruder 500. The third extruder 500 may also include outlets for the removal of any volatile materials, similar to the removal of gaseous material from the second kneader 480. As with the first and second extruders 420, 460, the third extruder 500 may be configured to maintain a desired thermal profile of the functionalized polymer as it is removed from the second kneader 480 and sent downstream.

In any embodiment, third extruder 500 may feed functionalized polymer to further downstream finishing processes. In any embodiment, downstream finishing may include pelletizing, bailing, and packaging operations of the type known in the art.

The functionalization zone configuration depicted in FIG. 3 can be further understood with reference to commonly assigned WO 2016/175938, which is hereby incorporated by reference.

In practicing the functionalized system and method disclosed, the functionalized polymer obtained from third extruder 500 contains 0.05 to 15 wt % of a functionalizing agent, or alternatively 0.1 to 8 wt % functionalizing agent, or alternatively 0.5 to 5 wt % functionalizing agent, or alternatively 1 to 3 wt % functionalizing agent. Where the olefinic-based polymer is an isobutylene based elastomer, the functionalized isobutylene based elastomer may include 0.1 to 10 wt % of a halogen, or alternatively 0.5 to 5 wt % of a halogen, or alternatively 1 to 2.5 wt % of a halogen. Alternatively, the functionalized isobutylene based elastomer may include random copolymers containing at least 80%, or at least 86.5 wt %, or alternatively up to 95 wt % of isobutylene derived units, about 5 to 20 wt % alkylstyrene derived units, and about 0.5 to 2.5 wt % of a halogen.

Specific Embodiments

Paragraph A: A synthesis system for producing a functionalized olefinic-based polymer comprising: a polymerization zone for producing an olefinic-based polymer, said polymerization zone comprising a mixing section, a deliquifying section, and a quenching section, wherein at least one section of the polymerization zone has a defined cross-sectional area that continually decreases from a first end to a second end of said section; a devolatilization zone comprising a kneader or extruder, wherein said devolatilization zone is downstream of said polymerization zone and in fluid communication with said polymerization zone; and a functionalization zone downstream of said devolatilization zone and in fluid communication with said devolatilization zone Paragraph B: The system of Paragraph A, where said functionalization zone comprises a first extruder, a first kneader downstream of said first extruder and in fluid communication with said first extruder, a second extruder downstream of said first kneader and in fluid communication with said first kneader, a second kneader downstream of said second extruder and in fluid communication with said second extruder; and a third extruder downstream of said second kneader and in fluid communication with said second kneader.

Paragraph C: The system of Paragraph B, where said first extruder is a screw extruder adapted to compact and heat the olefinic-based polymer, and where said first functionalization kneader is a sealed vessel that is adapted to maintain gaseous reactants that are introduced into said first functionalization kneader.

Paragraph D: The system of Paragraph B or C, where said second extruder is a single screw extruder adapted to regulate the volume of material within said first functionalization kneader and provide a flow rate of material into said second kneader.

Paragraph E: The system of one or any combination of Paragraphs B-D, where said first functionalization kneader and said second functionalization kneader include an intermeshing array of hooks and rotating paddles.

Paragraph F: The system of any one of or any combination of Paragraphs B-E, where said second functionalization kneader operates at a lower pressure than said first functionalization kneader.

Paragraph G: The system of any one of or any combination of Paragraphs A-F, wherein said mixing section has a generally cylindrical housing, an inlet proximate to a first end and an outlet proximate to an opposed second end, where said mixing section includes a rotatable shaft positioned axially within said housing and including at least two shearing paddles extending radially outward from said rotatable shaft.

Paragraph H: The system of any one of or any combination of Paragraphs A-G, wherein said mixing section has a generally cylindrical housing, an inlet proximate to a first end and an outlet proximate to an opposed second end, where said mixing section includes a rotatable shaft positioned axially within said housing, said housing including at least two kneading hooks fixed to said housing and extending inwardly toward said rotatable shaft.

Paragraph I: The system of any one of or any combination of Paragraphs A-H, where said deliquifying section and said quenching section are housed within a deliquifying-quench extruder having an inlet proximate to a first end and an outlet proximate to an opposed second end, said extruder including a shaft assembly positioned axially within said extruder and including multiple helical flight configurations, said extruder including multiple processing sections defined by the multiple flight configurations, said processing sections including a deliquifying-compaction section having the continually decreasing cross-sectional area, a sealing section downstream of the deliquifying-compaction zone, a devolatilization zone downstream of the sealing zone, a quenching zone downstream of the devolatilization zone, and a conveying zone downstream of the quenching zone.

Paragraph J: The system of any one of or any combination of Paragraphs A-I, where said deliquifying section is housed within a polymerization reactor, wherein said deliquifying section has the continually decreasing cross-sectional area in the form of a generally frustoconical housing having a first end larger than a second end, said first end constituting an inlet to said deliquifying section, and an outlet at said second end, where said deliquifying section includes a rotatable shaft positioned axially within said frustoconical housing and including at least one generally helical flight extending radially from the rotatable shaft.

Paragraph K: The system of any one of or any combination of Paragraphs A-J, where said polymerization zone further comprises a compaction section for compacting the olefinic-based polymer.

Paragraph L: The system of any one of or any combination of Paragraphs A-K, where said polymerization zone is adapted to produce the olefinic-based polymer in a granulated state.

Paragraph M: A process for the production of a functionalized olefinic-based polymer, wherein the process comprises: polymerizing a monomer mixture comprising either (i) two or more $C_4$ to $C_7$ monoolefin monomers or (ii) at least one $C_4$ to $C_7$ olefin monomer and at least one non-conjugated aliphatic diene, non-isoprene conjugated aliphatic diene, aromatic diene, or aryl monomer, wherein the monomer mixture is polymerized in the presence of a catalyst or catalyst components within a polymerization reactor to form a polymerization mixture comprising an olefinic-based polymer, optionally deliquifying and/or quenching the polymerization mixture, and functionalizing the olefinic-based polymer, wherein functionalizing comprises reacting the olefinic-based polymer substantially in the bulk phase with a functionalizing agent within a first kneader reactor to produce a functionalized polymer and by-products of the functionalization reaction.

Paragraph N: The process of Paragraph M, where the olefinic-based polymer exits the polymerization reactor in a granulated state.

Paragraph O: The process of Paragraph M or N, where the functionalization comprises halogenation.

Paragraph P: The process of any one of or any combination of Paragraphs M-O, where the functionalization comprises maleation.

Paragraph Q: The process of any one of or any combination of Paragraphs M-P, where said step of reacting the olefinic-based polymer with the functionalizing agent takes place when the olefinic-based polymer is at a temperature of from about 20 to about 200° C. and a pressure of from about 0.5 to about 10 atmospheres.

Paragraph R: The process of any one of or any combination of Paragraphs M-Q, where the olefinic-based polymer has (i) a crossover angular frequency ($\omega_c$) of greater than or equal to 1 rad/s or (ii) a $\omega_c$ of less than 1 rad/s and a plateau modulus ($G_N$) of less than $1.2 \times 10^5$ Pa.

Paragraph S: The process of any one of or any combination of Paragraphs M-R, further comprising separating the functionalized polymer from at least a portion of the by-products of the functionalization reaction within a second kneader reactor.

Paragraph T: The process of Paragraph S, where said step of separating takes place at a temperature of from about 20 to about 200° C. and a pressure of from about 0.02 to about 2 atmospheres.

Paragraph U: The process of any one of or any combination of Paragraphs M-T, where the polymerization takes place in at least one of a solution and a slurry system.

Paragraph V: The process of Paragraph U, where the monomer mixture, catalyst, polymer, and a diluent are subjected to kneading and/or granulating to thereby form the polymerization mixture within the polymerization reactor.

Paragraph W: The process of Paragraph U or V, where the polymerization mixture is subjected to deliquifying, quenching, and devolatilization prior to said functionalization.

Paragraph X: The process of Paragraph W, where said deliquifying, said quenching, and said devolatilization comprises processing the polymerization mixture within a deliquifying-quench extruder by subjecting the polymerization mixture, or a portion thereof, to a sequential series of steps including (a) compacting the polymerization mixture to force diluent entrained within the polymer to separate from the polymer while permitting bidirectional flow whereby the polymer is conveyed in one direction while the diluent is allowed to flow in an opposite direction, (b) restricting the flow of material within the deliquifying-quench extruder to thereby create a seal between an upstream portion and a downstream portion of the deliquifying-quench extruder, (c) subjecting the polymer to reduced pressures to thereby volatilize at least a portion of any diluent or monomer entrained within the polymer, (d) introducing a quenching agent to the polymer while subjecting the polymer to shear and mixing, and (e) conveying the polymer out of the deliquifying-quench extruder.

Paragraph Y: The process of Paragraph X, where said deliquifying comprises separating the polymer product from at least a portion of the diluent within a deliquifying section of said polymerization reactor, whereby the polymer is conveyed in one direction while the diluent is allowed to flow in an opposite direction.

Paragraph Z: The process of any one of or any combination of Paragraphs M-T, wherein the monomer mixture is polymerized substantially in the bulk phase.

Paragraph AA: A process for the production of a functionalized olefinic-based polymer, wherein the process comprises: polymerizing a monomer mixture comprising $C_3$ olefin monomer, $C_2$ olefin monomer, and optionally at least one diene monomer in the presence of a catalyst or catalyst components within a polymerization reactor to form a polymerization mixture comprising an olefinic-based polymer, optionally deliquifying and/or quenching the polymerization mixture, and functionalizing the olefinic-based polymer, wherein functionalizing comprises reacting the olefinic-based polymer substantially in the bulk phase with a functionalizing agent within a first kneader reactor to produce a functionalized polymer and by-products of the functionalization reaction.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

For all jurisdictions in which the doctrine of "incorporation by reference" applies, all of the test methods, patent publications, patents and reference articles are hereby incorporated by reference either in their entirety or for the relevant portion for which they are referenced.

When numerical lower limits and numerical upper limits are listed herein, ranges from any lower limit to any upper limit are contemplated. The term "comprising" is synonymous with the term "including". Likewise whenever a composition, an element or a group of components is preceded with the transitional phrase "comprising", it is understood that we also contemplate the same composition or group of components with transitional phrases "consisting essentially of", "consisting of", "selected from the group of consisting of", or "is" preceding the recitation of the composition, component, or components, and vice versa.

The invention claimed is:

1. A synthesis system for producing a functionalized olefinic-based polymer comprising:
   (i) a polymerization zone for producing an olefinic-based polymer, said polymerization zone comprising a mixing section, a deliquifying section, and a quenching section, wherein at least one section of the polymerization zone has a defined cross-sectional area that continually decreases from a first end to a second end of said section;
   (ii) a devolatilization zone comprising a kneader or extruder, wherein said devolatilization zone is downstream of said polymerization zone and in fluid communication with said polymerization zone; and
   (iii) a functionalization zone downstream of said devolatilization zone and in fluid communication with said devolatilization zone.

2. The system of claim 1, wherein said functionalization zone comprises:
   a. a first extruder;
   b. a first functionalization kneader downstream of said first extruder and in fluid communication with said first extruder;
   c. a second extruder downstream of said first functionalization kneader and in fluid communication with said first functionalization kneader;
   d. a second functionalization kneader downstream of said second extruder and in fluid communication with said second extruder; and
   e. a third extruder downstream of said second functionalization kneader and in fluid communication with said second functionalization kneader.

3. The system of claim 2, wherein said first extruder is a screw extruder adapted to compact and heat the olefinic-based polymer, and wherein said first functionalization kneader is a sealed vessel that is adapted to maintain gaseous reactants that are introduced into said first functionalization kneader.

4. The system of claim 2, wherein said second extruder is a single screw extruder adapted to regulate the volume of material within said first functionalization kneader and provide a flow rate of material into said second kneader.

5. The system of claim 2, wherein said first functionalization kneader and said second functionalization kneader include an intermeshing array of hooks and rotating paddles.

6. The system of claim 1, wherein said mixing section has a cylindrical housing, an inlet proximate to a first end and an outlet proximate to an opposed second end, where said mixing section includes a rotatable shaft positioned axially within said housing and including at least two shearing paddles extending radially outward from said rotatable shaft.

7. The system of claim 1, wherein said mixing section has a cylindrical housing, an inlet proximate to a first end and an outlet proximate to an opposed second end, where said mixing section includes a rotatable shaft positioned axially within said housing, said housing including at least two kneading hooks fixed to said housing and extending inwardly toward said rotatable shaft.

8. The system of claim 1, wherein said deliquifying section and said quenching section are housed within a deliquifying-quench extruder having an inlet proximate to a first end and an outlet proximate to an opposed second end, said extruder including a shaft assembly positioned axially within said extruder and including multiple helical flight configurations, said extruder including multiple processing sections defined by the multiple flight configurations, said processing sections including a deliquifying-compaction section having the continually decreasing cross-sectional area, a sealing section downstream of the deliquifying-compaction section, a devolatilization section downstream of the sealing section, a quenching section downstream of the devolatilization section, and a conveying section downstream of the quenching section.

9. The system of claim 1, wherein said deliquifying section is housed within a polymerization reactor, wherein said deliquifying section has the continually decreasing cross-sectional area in the form of a frustoconical housing having a first end larger than a second end, said first end constituting an inlet to said deliquifying section, and an outlet at said second end, where said deliquifying section includes a rotatable shaft positioned axially within said frustoconical housing and including at least one helical flight extending radially from the rotatable shaft.

10. The system of claim 1, wherein said polymerization zone further comprises a compaction section for compacting the olefinic-based polymer.

11. A process for the production of a functionalized olefinic-based polymer using the synthesis system of claim 1, wherein the process comprises:
   polymerizing a monomer mixture comprising either (i) two or more $C_4$ to $C_7$ monoolefin monomers or (ii) at least one $C_4$ to $C_7$ olefin monomer and at least one non-conjugated aliphatic diene, non-isoprene conjugated aliphatic diene, aromatic diene, or aryl monomer, wherein the monomer mixture is polymerized in the presence of a catalyst or catalyst components within a polymerization reactor to form a polymerization mixture comprising an olefinic-based polymer,
   optionally deliquifying and/or quenching the polymerization mixture, and
   functionalizing the olefinic-based polymer, wherein functionalizing comprises reacting the olefinic-based polymer substantially in the bulk phase with a functionalizing agent within a first kneader reactor to produce a functionalized polymer and by-products of the functionalization reaction.

12. The process of claim 11, wherein the olefinic-based polymer exits the polymerization reactor in a granulated state.

13. The process of claim 11, wherein the functionalization comprises halogenation.

14. The process of claim 11, wherein the functionalization comprises maleation.

15. The process of claim 11, wherein said step of reacting the olefinic-based polymer with the functionalizing agent takes place when the olefinic-based polymer is at a temperature of from about 20 to about 200° C. and a pressure of from about 0.5 to about 10 atmospheres.

16. The process of claim 11, wherein the olefinic-based polymer has (i) a crossover angular frequency ($\omega_c$) of greater than or equal to 1 rad/s or (ii) a $\omega_c$ of less than 1 rad/s and a plateau modulus ($G_N$) of less than $1.2 \times 10^5$ Pa.

17. The process of claim 11, further comprising separating the functionalized polymer from at least a portion of the by-products of the functionalization reaction within a second kneader reactor.

18. The process of claim 17, wherein said step of separating takes place at a temperature of from about 20 to about 200° C. and a pressure of from about 0.02 to about 2 atmospheres.

19. The process of claim 11, wherein the polymerization takes place in at least one of a solution and a slurry system.

20. The process of claim 19, wherein the monomer mixture, catalyst, polymer, and a diluent are subjected to kneading and/or granulating to thereby form the polymerization mixture within the polymerization reactor.

21. The process of claim 19, wherein the polymerization mixture is subjected to deliquifying, quenching, and devolatilization prior to said functionalization.

22. The process of claim 21, wherein said deliquifying, said quenching, and said devolatilization comprises processing the polymerization mixture within a deliquifying-quench extruder by subjecting the polymerization mixture, or a portion thereof, to a sequential series of steps including (a) compacting the polymerization mixture to force diluent entrained within the polymer to separate from the polymer while permitting bidirectional flow whereby the polymer is conveyed in one direction while the diluent is allowed to flow in an opposite direction, (b) restricting the flow of material within the deliquifying-quench extruder to thereby create a seal between an upstream portion and a downstream portion of the deliquifying-quench extruder, (c) subjecting the polymer to reduced pressures to thereby volatilize at least a portion of any diluent or monomer entrained within the polymer, (d) introducing a quenching agent to the polymer while subjecting the polymer to shear and mixing, and (e) conveying the polymer out of the deliquifying-quench extruder.

23. The process of claim 21, wherein said deliquifying comprises separating the polymer product from at least a portion of the diluent within a deliquifying section of said polymerization reactor, whereby the polymer is conveyed in one direction while the diluent is allowed to flow in an opposite direction.

24. The process of claim 11, wherein the monomer mixture is polymerized substantially in the bulk phase.

25. A process for the production of a functionalized olefinic-based polymer using the synthesis system of claim 1, wherein the process comprises:
  polymerizing a monomer mixture comprising $C_3$ olefin monomer, $C_2$ olefin monomer, and optionally at least one diene monomer in the presence of a catalyst or catalyst components within a polymerization reactor to form a polymerization mixture comprising an olefinic-based polymer,
  optionally deliquifying and/or quenching the polymerization mixture, and
  functionalizing the olefinic-based polymer, wherein functionalizing comprises reacting the olefinic-based polymer substantially in the bulk phase with a functionalizing agent within a first kneader reactor to produce a functionalized polymer and by-products of the functionalization reaction.

* * * * *